Patented June 19, 1923.

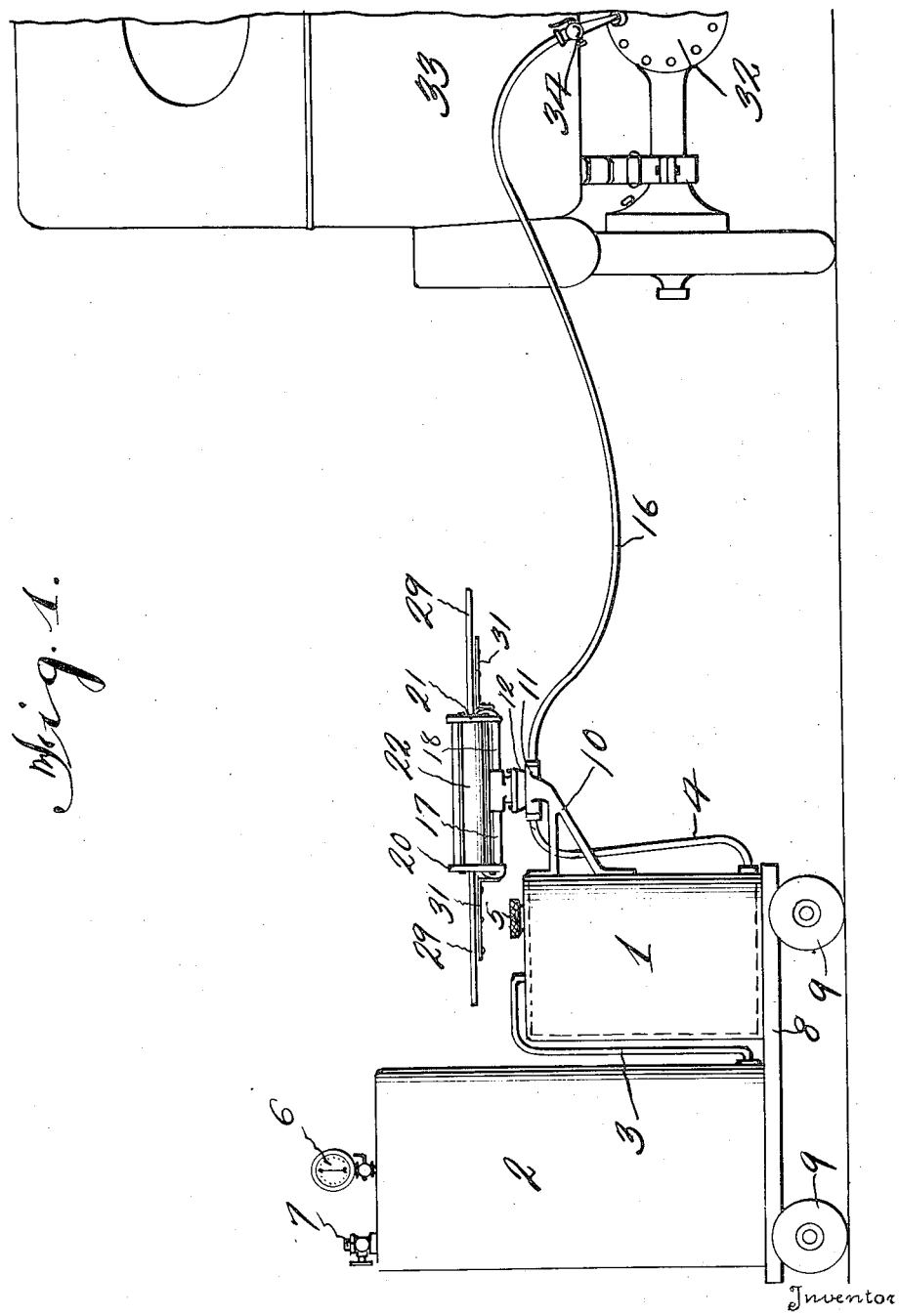

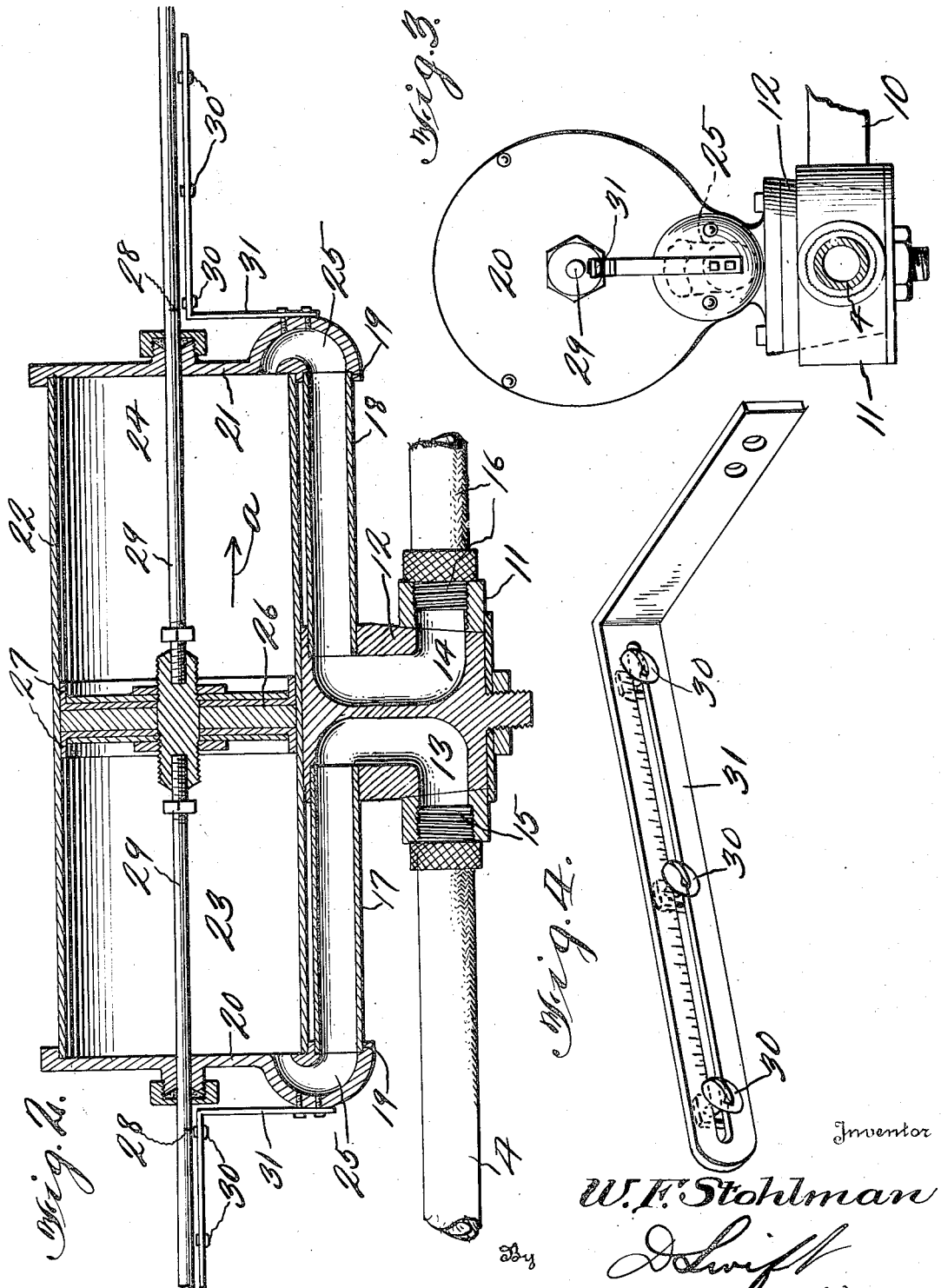

1,459,606

UNITED STATES PATENT OFFICE.

WILLIAM FREDRICK STOHLMAN, OF LONG BEACH, CALIFORNIA.

GREASE DISPENSER.

Application filed January 31, 1922. Serial No. 532,986.

*To all whom it may concern:*

Be it known that I, WILLIAM FREDRICK STOHLMAN, a citizen of the United States, residing at Long Beach, in the county of Los Angeles, State of California, have invented a new and useful Grease Dispenser; and I do hereby declare the following to be a full, clear, and exact description of the invention, such as will enable others skilled in the art to which it appertains to make and use the same.

The invention relates to dispensing apparatus and has for its object to provide a dispensing apparatus, particularly adapted for dispensing oils and greases, in measured quantities and particularly to transmission casings of motor driven vehicles.

A further object is to provide a grease dispensing apparatus comprising a cylinder having a piston slidably mounted therein and provided with ports at the ends of the cylinder through which ports grease is alternately taken in and discharged upon a reverse positioning of the cylinder which is centrally pivoted, and provided with ports in communication with intake and discharge ports carried by a plug valve on which the cylinder is mounted.

A further object is to provide the piston with gage rods extending through the heads of the cylinder, and forming means whereby the amount of grease taken into the cylinder and discharged may be ascertained. Also to provide means whereby grease or oil from a supply tank will be fed to the cylinder under pressure.

With the above and other objects in view the invention resides in the combination and arrangement of parts as hereinafter set forth, shown in the drawings described and claimed, it being understood that changes in the precise embodiment of the invention may be made within the scope of what is claimed without departing from the spirit of the invention.

In the drawings:—

Figure 1 is a side elevation of the dispensing apparatus and a rear view of a portion of an automobile, showing the device in position for use.

Figure 2 is a vertical longitudinal sectional view through the pivoted cylinder and the plug valve carried thereby.

Figure 3 is an end view of the pivoted cylinder and the plug valve.

Figure 4 is a perspective view of one of the scale brackets.

Referring to the drawing, the numeral 1 designates a grease or oil receiving tank, and 2 a pressure tank connected to the oil receiving tank 1 by means of a pipe 3, said pressure tank forming means whereby a constant pressure will be maintained within the oil and grease receiving tank 1 and forced therefrom through the discharge pipe 4. The grease receiving tank 1 is provided with a cap 5 which may be removed when it is desired to fill the tank 1. The pressure tank 2 is provided with a conventional form of indicator 6 for indicating the pressure within the tank, and is provided with a valve controlled hose connection 7 which may have connected thereto a hose leading to a source of air supply, such for instance as a pump. The tanks 1 and 2 are preferably mounted on a platform 8 supported on wheels 9, thereby allowing the device as a whole to be moved from place to place as desired.

Extending outwardly from the side of the grease tank 1 is a supporting bracket 10, which bracket has formed integrally therewith a valve casing 11, which casing has pivotally mounted therein a plug valve 12, which is vertically disposed and provided with ports 13 and 14, which ports alternately form intake and discharge ports during the operation of the device according to whether the port is in registration with the intake pipe 15 carried by the casing 11 or the dscharge pipe 16 carried by the casing 11. The ports 13 and 14 extending vertically through the plug valve 12 and are in communication with the chambers of the pipes 17 and 18, which pipes are carried by the plug valve and extend in opposite directions and are secured at 19 to cylinder heads 20 and 21 carried by a cylinder 22 and are in communication with the ends 23 and 24 of the chamber of the cylinder 22 through ports 25. Mounted in the cylinder 22 is a piston 26 which reciprocates within the piston and which is provided with conventional packing 27 for preventing leakage around the piston when pressure is on either side thereof. The grease is forced from the supply tank 1 through pipe 4 through the end 15 of the intake pipe, port 13, pipe 17, port 25 and into the end 23 of the chamber of the cylinder, which action moves the piston 26 in the direction of the arrow *a* and grease or oil into the end 23 of the cylinder. The amount of grease or oil forced into the cylinder may be ascertained by means of the markings 28 carried by the rods 29, which markings may register with any of the adjustable markers 30 carried by the brackets 31. As the piston 26 moves in the direction of the arrow *a* to a desired position for intaking a predetermined amount of grease or oil, the operator pivots the cylinder 22 and the plug valve 12 around on its pivotal point in a horizontal plane, which action will place the port 14 in registration with the end 15 of the intake pipe 4, thereby causing grease to enter the end 24 of the cylinder 22 through the pipe 18, and force the piston in the opposite direction, which will cause the previously intaken grease to be forced from the end 23 of the cylinder, through the pipe 17, port 13 in the plug valve 12, and through the discharge pipe 16 to a differential casing 32 of an automobile 33. The discharge pipe 16 is provided with a valve 14 whereby the flow of oil through the pipe may be stopped. The above operation is repeated from time to time as the oil or grease is dispensed.

From the above it will be seen that a grease or oil dispensing device is provided, which device is particularly adapted for use in connection with automobile service stations, and one wherein the material is accurately measured and dispensed and also one wherein the parts have been reduced to a minimum, thereby allowing the device to be cheaply manufactured and sold.

The invention having been set forth what is claimed as new and useful is:—

1. A dispensing device comprising a cylinder, a piston slidably mounted in said cylinder, said cylinder being mounted on a plug valve, a valve casing carried by said valve, an intake pipe connected to the valve casing and in communication with one end of the cylinder through a port extending through the valve, a discharge pipe carried by the casing and in communication with the other end of the cylinder through a port carried by the valve, and means whereby the positions of the ports in the valve may be reversed for intermittently causing intaking and discharging operations of the piston in the casing.

2. A fluid dispensing apparatus comprising a cylinder, a piston disposed in said cylinder, said cylinder being mounted on a plug valve having an intake and a discharge port, a supply pipe in communication with the intake port and in communication with one end of the cylinder through the intake port, of means for forcing fluid through the supply pipe, the discharge port being in communication with the other end of the cylinder and in communication with the discharge pipe, means whereby the positions of the valve ports may be reversed by a rotation of the cylinder, and gage means whereby the distance of movement of the piston may be ascertained during intaking and discharging operations.

In testimony whereof I have signed my name to this specification in the presence of two subscribing witnesses.

WILLIAM FREDRICK STOHLMAN.

Witnesses:
HOWARD S. HOYT,
F. CLARE THOMAS.